United States Patent [19]

Grenci et al.

[11] Patent Number: 5,516,154

[45] Date of Patent: May 14, 1996

[54] PLASTIC VACUUM COMPONENT WITH GROOVE FOR SEAL

[76] Inventors: Charles Grenci, 205 Brown Rd., Montrose, Colo. 81401; R. Dallas Clayton, 501 Alvarado Dr. NE., Albuquerque, N.M. 87108

[21] Appl. No.: 342,625

[22] Filed: Nov. 21, 1994

Related U.S. Application Data

[60] Division of Ser. No. 77,894, Jun. 15, 1993, Pat. No. 5,406,753, which is a continuation-in-part of Ser. No. 894,464, Jun. 5, 1992, Pat. No. 5,341,567.

[51] Int. Cl.⁶ .............................. F16L 17/00; A47L 9/24
[52] U.S. Cl. .............. 285/7; 285/113; 285/379; 277/189; 277/170
[58] Field of Search .................... 277/168, 225, 277/214, 178, 189, 181, 170, 166, 169; 285/350, 345, 347, 112, 113, 7, 349, 379; 55/DIG. 2, DIG. 3

[56] References Cited

U.S. PATENT DOCUMENTS

| | | | |
|---|---|---|---|
| 1,083,350 | 1/1914 | Davis | 285/379 |
| 2,270,519 | 1/1942 | Fisher | 285/347 |
| 2,477,533 | 7/1949 | Whiting | 285/347 |
| 2,867,463 | 1/1959 | Snider | 277/225 |
| 3,239,244 | 3/1966 | Leinfelt | 285/7 |
| 3,565,464 | 2/1971 | Wolf | 285/7 |
| 4,067,534 | 1/1978 | Frey | 285/423 |
| 4,306,652 | 12/1981 | Inaba | 277/214 |
| 4,309,048 | 1/1982 | Ahlf et al. | 285/7 |
| 4,941,689 | 7/1990 | Sjöberg | 285/7 |
| 5,039,139 | 8/1991 | McElroy et al. | 285/7 |

FOREIGN PATENT DOCUMENTS 4677 of 1910 United Kingdom ................. 285/379

*Primary Examiner*—Eric K. Nicholson
*Attorney, Agent, or Firm*—Milton S. Gerstein; Marvin N. Benn

[57] ABSTRACT

The Invention relates specifically to an improved method of joining plastic socket fit piping components for vacuum, pressure, and structural applications where a leak and contamination free connection is needed. A unique Dual Face/Circumferential Elastomer Seal is installed in a special Seal Groove located on the end of the male component. The male components are then inserted into the female sockets until contact is made between the Dual Face/Circumferential Elastomer Seals and the Female Socket Base Surfaces. The final assembly is evacuated with a vacuum pump to actuate and fully compress the seals. The final assembly is then checked for leaks. If the connections are to remain under vacuum and the ability to disassemble is advantageous, no further work is required. If the assembly is to contain positive pressure or withstand heavy structural forces, a hollow, Heated Retaining Plug is inserted through a Female Socket Retaining Collar and the Female Socket Wall into the Male Component Wall, while the assembly is still under Vacuum Seal Actuation/Compression. The number of Heated Retaining Plugs that are inserted is determined by the amount of pressure and structural force that the assembly is required to contain.

12 Claims, 7 Drawing Sheets

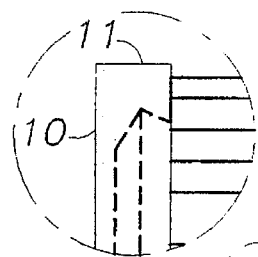
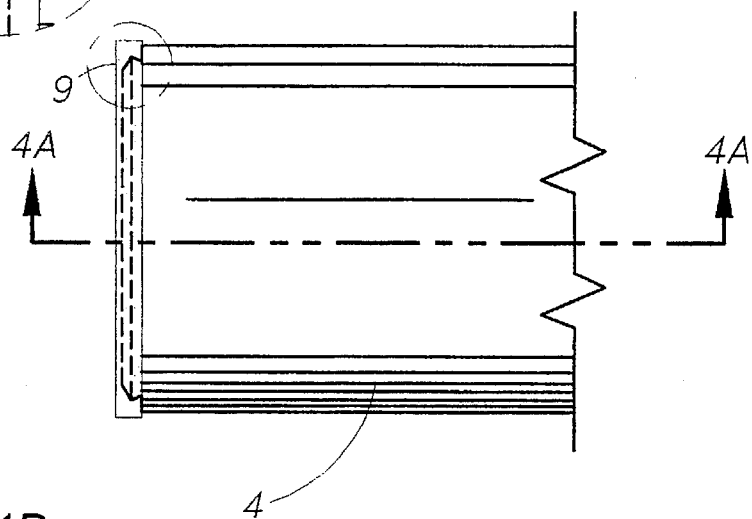
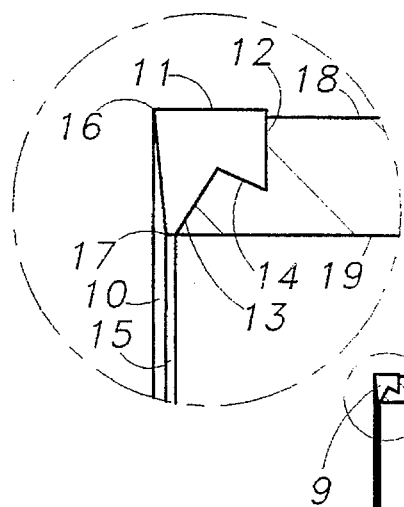
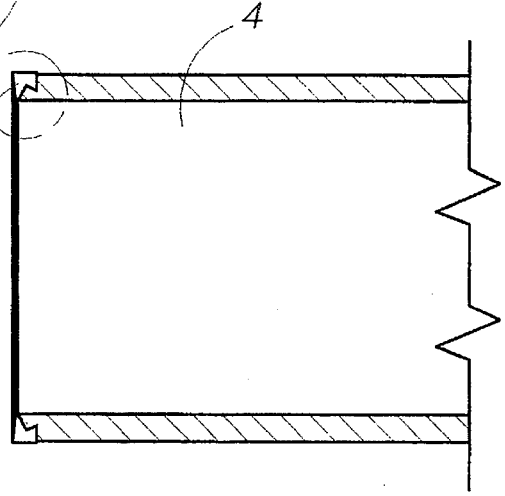

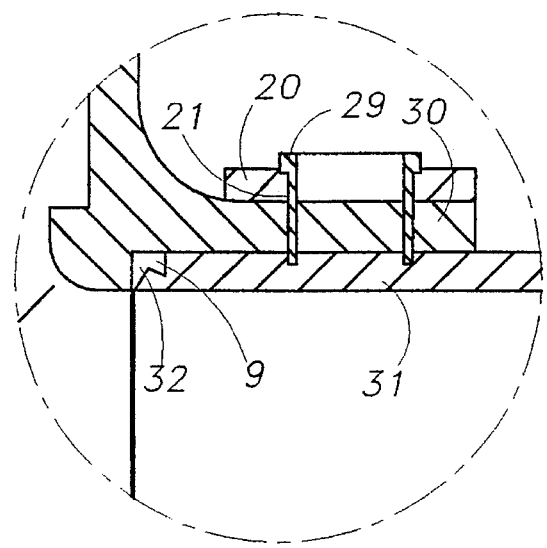
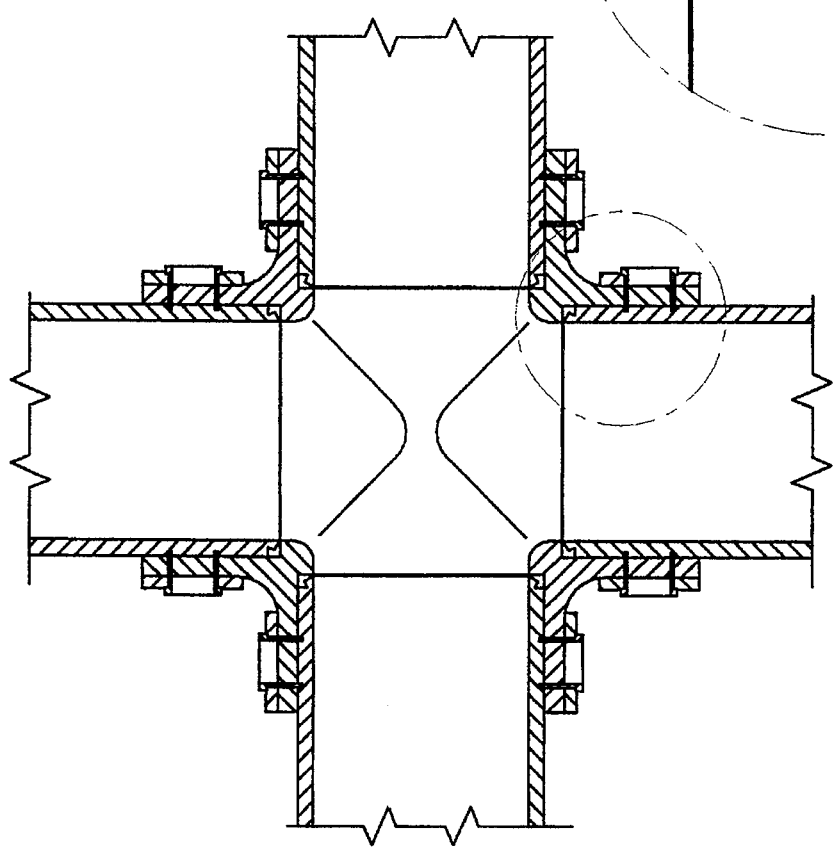

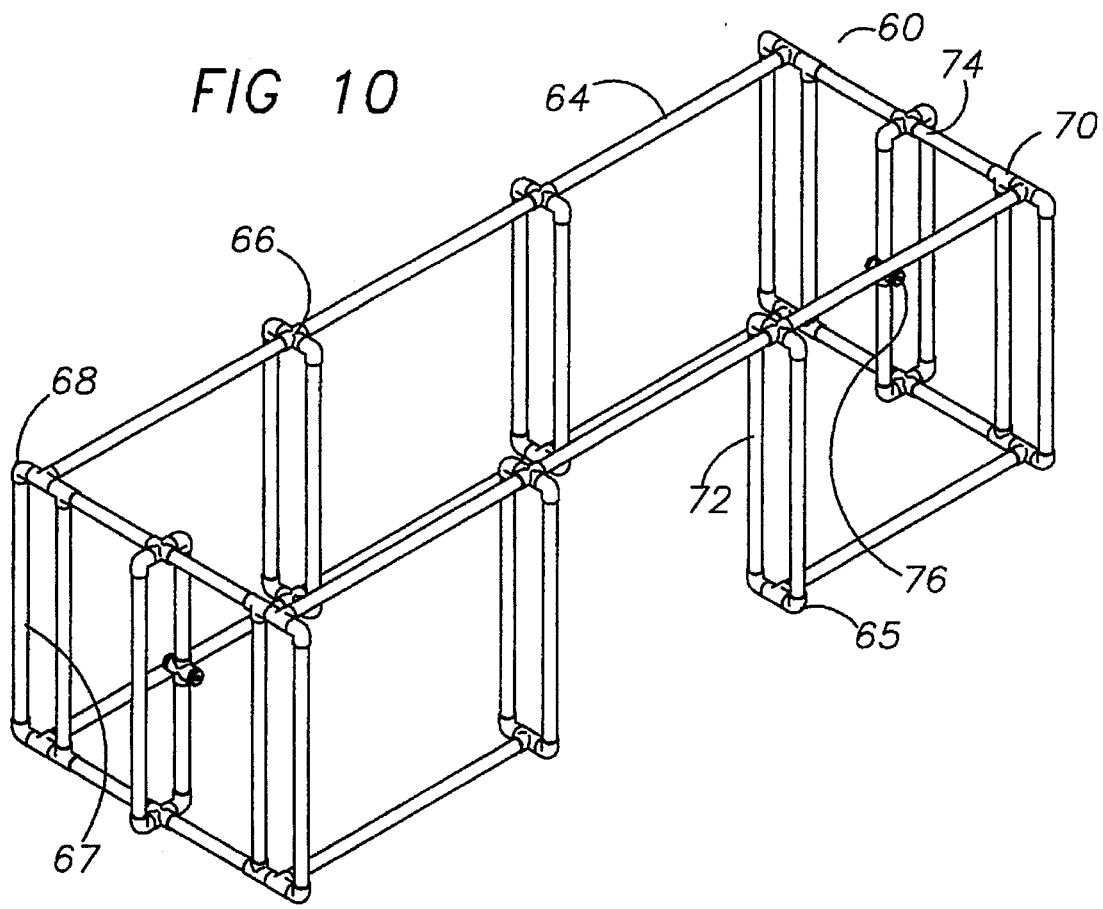

PLASTIC VACUUM COMPONENT WITH GROOVE FOR SEAL

CROSS REFERENCE TO RELATED APPLICATION

This is a division of Ser. No. 77,894, filed Jun. 15, 1993, U.S. Pat. No. 5,406,753, which is a continuation-in-part application of Ser. No. 07/894,464 filed on Jun. 5, 1992, now U.S. Pat. No. 5,341,567.

BACKGROUND OF THE INVENTION

1. Field of the Invention (Technical Field)

The Invention relates specifically to an improved method of joining plastic socket fit piping components for vacuum, pressure, and structural applications where a leak and contamination free connection is needed.

2. Background Art

Plastic socket fit components are commonly used in the assembly of piping systems. Traditional socket fit components require permanent cemented or welded assembly. This type of assembly is not well suited for clean vacuum or pressure piping systems due to the potential for contamination entrapment voids between the female socket inside diameter and the inserted male component outside diameter. Often, the cement used to join the male component to the female socket is a source of contamination to the process vacuum, gas or fluid. In addition, cemented joints have been known to fail in certain basic applications, such as compressed air service, where the integrity of the cement is compromised by oil in the compressed air.

SUMMARY OF THE INVENTION

The invention is an improved method of joining plastic socket fit piping components for vacuum, pressure and structural applications. The Clean Socket Fit Connection provides a leak and contamination free connection that is easy and economical to make. A unique Dual Face/Circumferential Elastomer Seal is installed in a special Seal Groove located on the end of the male component. The male components are then inserted into the female sockets until contact is made between the Dual Face/Circumferential Elastomer Seals and the Female Socket Base Surfaces. The final assembly is evacuated with a vacuum pump to actuate and fully compress the seals. The final assembly is then checked for leaks. If the connections are to remain under vacuum and the ability to disassemble is advantageous, no further work is required. If the assembly is to contain positive pressure or withstand heavy structural forces, a hollow, Heated Retaining Plug is inserted through a Female Socket Retaining Collar and the Female Socket Wall into the Male Component Wall, while the assembly is still under Vacuum Seal Actuation/Compression. The number of Heated Retaining Plugs that are inserted is determined by the amount of pressure and structural force that the assembly is required to contain. The invention is also directed to a structure made of plastic piping components, which structure is held together only by a vacuum created in the piping components.

BRIEF DESCRIPTION OF THE DRAWINGS

The accompanying drawings, which are incorporated into and form a part of the specification, illustrate the preferred embodiment of the invention and, subsequently, are not to be construed as limiting the invention.

FIG. 3 is an elevation view of the Pipe Section shown in FIG. 2 with the invention Dual Face/Circumferential Elastomer Seal installed with an enlarged view of the Seal Circumferential Surface 11 and the Seal Face Surface 10;

FIG. 4 is a cross-sectional elevation view taken on line 4—4 of FIG. 3, with an enlarged view of the Seal Groove and Dual Face/Circumferential Elastomer Seal geometry;

FIG. 9 is an elevation view of the Socket Fit Cross in FIG. 8, with an enlarged view of the installed Heated Retaining Plugs; and FIG. 10 is a perspective view of a booth-structure made up of a plastic piping components interconnected by means of the sealed connections shown in FIGS. 2–4, with the structure being self-sustaining by means of the vacuum crested in the piping components.

DESCRIPTION OF THE PREFERRED EMBODIMENTS

Figure 1A:
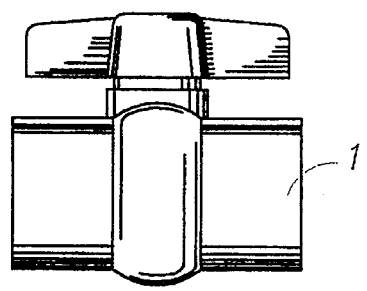
FIG. 1 is an elevation view of a Socket Fit Valve, a Socket Fit Cross, and a Pipe Section.
Figure 1B:
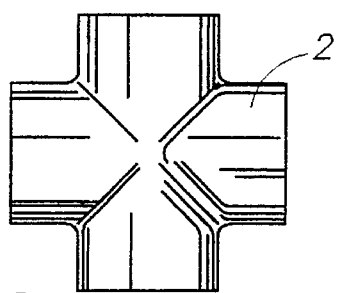
Figure 1C:
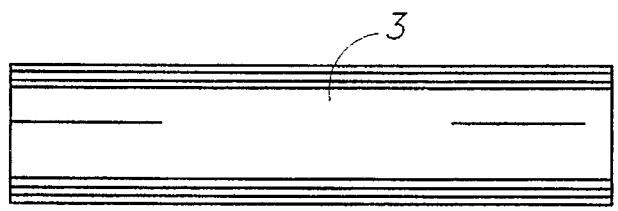

Referring to FIG. 1, a plastic Socket Fit Valve 1, a plastic Socket Fit Cross 2 and a plastic Pipe Section 3 are shown to illustrate some of the socket fit components which can utilize the Clean Socket Fit Connection.

Figure 2B:
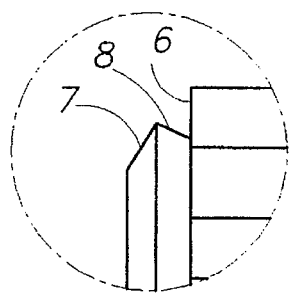
FIG. 2 is an elevation view of a Pipe Section with the invention Seal Groove installed and with an enlarged view of the invention Seal Groove geometry.
Figure 2A:
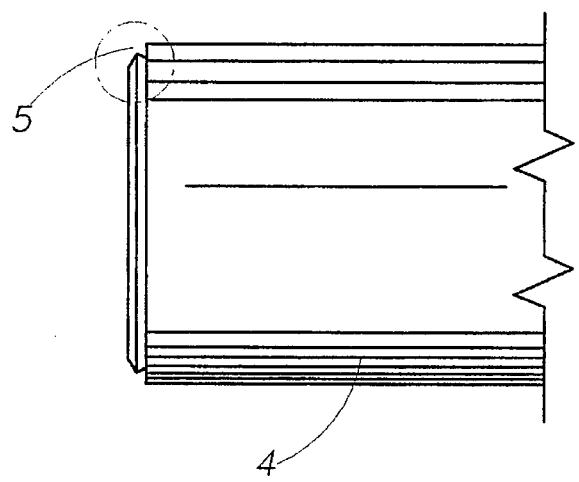

Referring to FIG. 2, a plastic Pipe Section With Seal Groove 4 is shown with enlarged detail of the Seal Groove 5 geometry that is installed on the end of male components through cutting or molding. The Seal Groove 5 geometry consists of three basic surfaces; a Seal Groove Primary Compression Surface 6, a Seal Groove Secondary Compression Surface 7 and a Seal Groove Retaining Surface 8. The function of these surfaces will be explained in later figures.

Referring to FIG. 3, a plastic Pipe Section With Seal Groove 4 is shown with the Dual Face/Circumferential Elastomer Seal 9 stretch installed over the Seal Groove 5 to insure that a tight fit is created. The enlarged detail shows the Seal Circumferential Surface 11 and the Seal Face Surface 10, which will be described further in later figures.

Referring to FIG. 4, a cross section of the plastic Pipe Section With Seal Groove 4 and Dual Face/Circumferential Elastomer Seal 9 in FIG. 3 is shown. The enlarged detail in this figure shows the geometry of the Dual Face/Circumferential Elastomer Seal 9, which consists of the following surfaces; a Seal Face Surface 10, a Seal Circumferential Surface 11 that is slightly large in diameter than the Male Component Outside Diameter Surface 18, a Seal Primary Compression Surface 12, a Seal Secondary Compression Surface 13, a Seal Retaining Surface 14, a Seal Process Contact Surface 15 that is flush with the Male Component Process Contact Inside Surface 19, a Seal Primary Contact Corner 16 and a Seal Secondary Contact Corner 17. The function of these surfaces will be explained in later figures.

Figure 5:
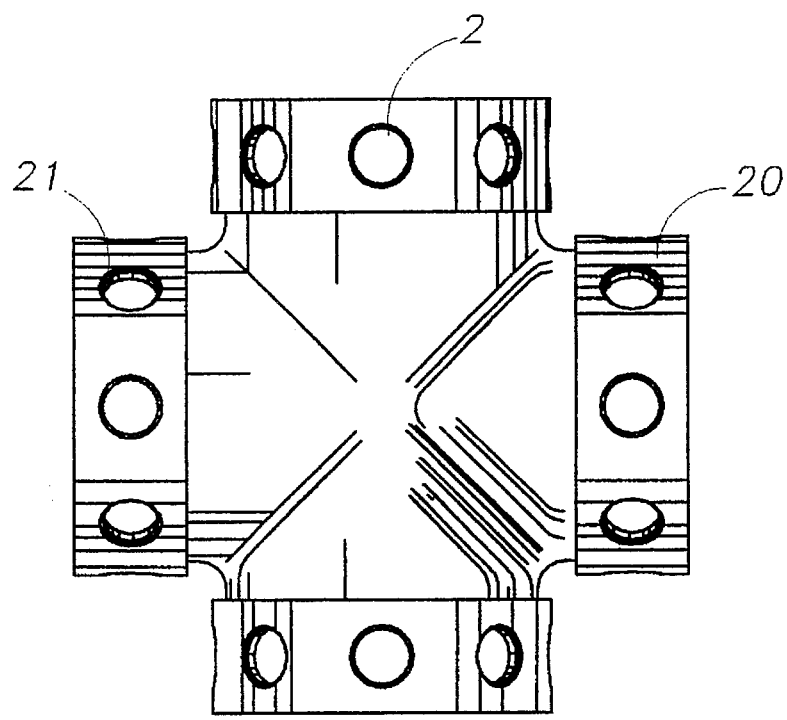
FIG. 5 is an elevation view of a Socket Fit Cross with Female Socket Retaining Collars installed.

Referring to FIG. 5, the plastic Socket Fit Cross 2 from FIG. 1 is shown with Female Socket Retaining Collars 20. These collars are installed at this stage if the Clean Socket Fit Connection is to contain positive pressure or withstand structural forces. The Female Socket Retaining Collar 20 provides multiple Retaining Plug Guide Holes 21, which will be described further in later figures.

Figure 6:
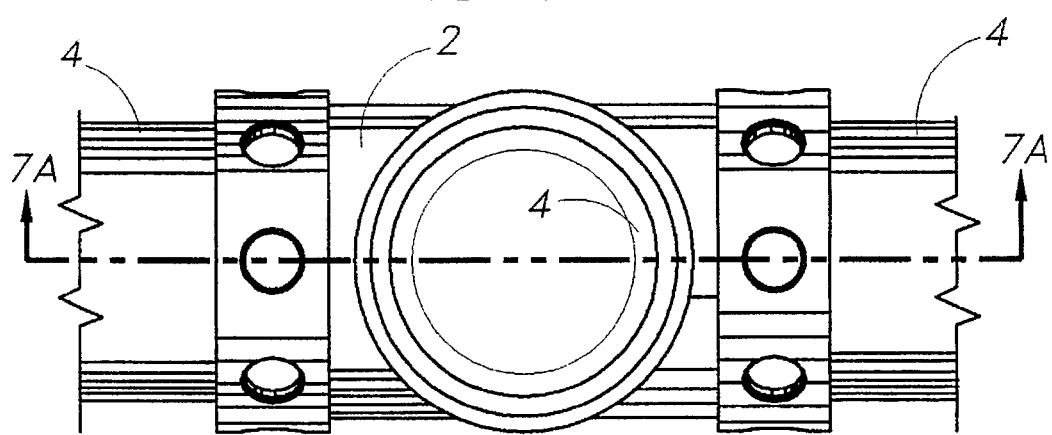
FIG. 6 is a plan view of the Socket Fit Cross in FIG. 5 with the Pipe Section shown in FIG. 3 installed.

Referring to FIG. 6, a plan view of the plastic Socket Fit Cross 2 in FIG. 5 is shown with the plastic Pipe Sections With Seal Grooves 4 from FIG. 3 inserted into each female socket.

Figure 7B:
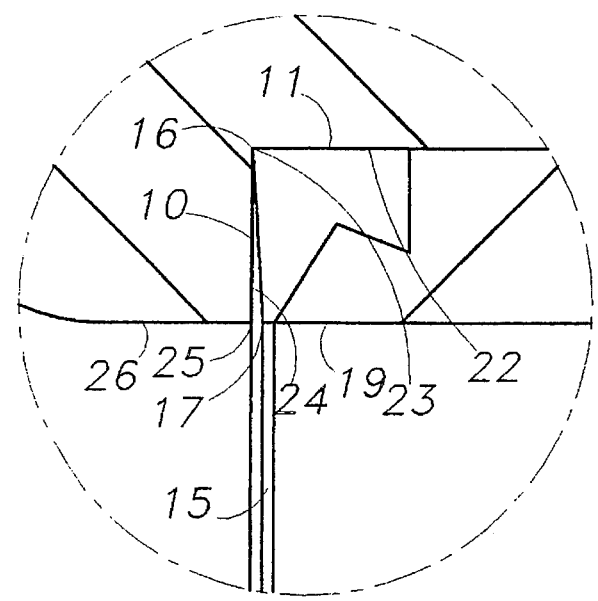
FIG. 7 is a cross-sectional elevation view taken on line 7—7 of FIG. 6, with an enlarged view of the Dual Face/Circumferential Elastomer Seal relationship to the Female Socket Base Surface 24 prior to Vacuum Seal Actuation/Compression.
Figure 7A:
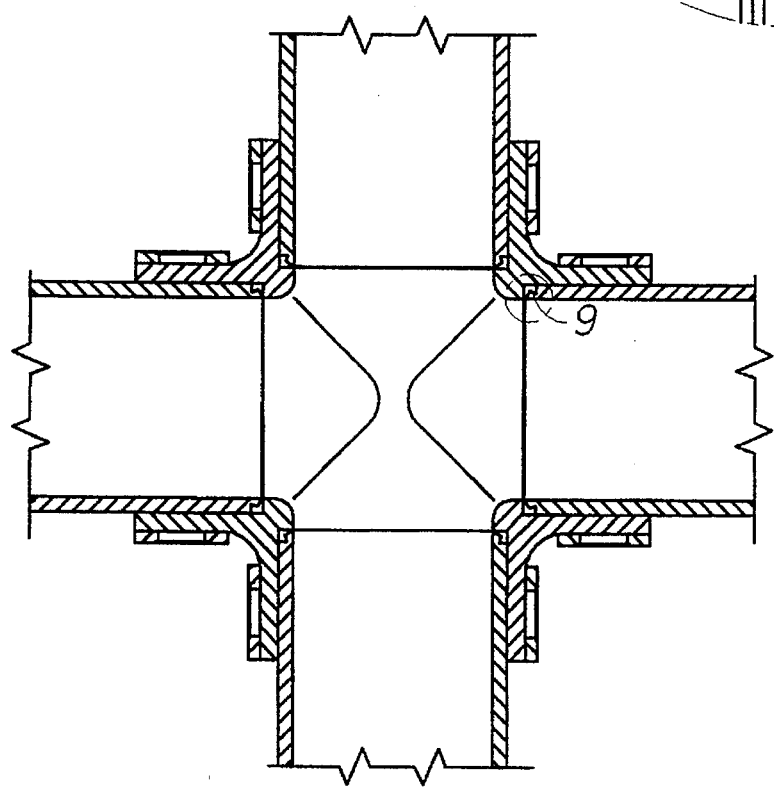

Referring to FIG. 7, a cross section of the assembly in FIG. 6 is shown. This figure shows the relationship of the inserted plastic Pipe Section male components to the female sockets prior to Vacuum Seal Actuation/Compression. The enlarged detail shows the Seal Circumferential Surface 11 in contact with the Female Socket Inside Diameter Surface 22 and the Seal Primary Contact Corner 16 touching the Female Socket Primary Contact Base Corner 23. The contact of these surfaces provides a preliminary seal for final Vacuum Seal Actuation/Compression. At this point there is a contamination entrapment area between the Seal Face Surface 10 and the Female Socket Base Surface 24. When the assembly is evacuated with a vacuum pump, the male component is pulled into the female socket until the Seal Secondary Contact Corner 17 contacts the Female Socket Secondary Contact Base Corner 25. The progressive elimination of the gap between the primary seal contact corner and the secondary contact corner minimizes the potential for trapped gas pockets in the Seal Face Surface 10. This substantially reduces the potential for a vacuum virtual leak. A vacuum virtual leak is a leak that is not external in nature but, rather, a trapped gas volume that slowly leaks into the assembly interior vacuum space. Vacuum virtual leaks are difficult to locate with conventional leak detection equipment that is designed to detect a leak from the exterior of the assembly to the interior or visa-versa. The Seal Process Contact Surface 15 separates the Male Component Process Contact Inside Surface 19 from the Female Component Process Contact Inside Surface 26. Any contact between the component inside surfaces prior to a seal surface would create a contamination entrapment area. The Seal Process Contact Surface 15 prevents the creation of a contamination entrapment area while presenting a minimum amount of elastomer surface area to the contained process. This provides a smooth boreline transition between the Male Component Process Contact Inside Surface 19 and the Female Component Process Contact Inside Surface 26. The minimal amount of exposed elastomer reduces the amount of gas that is able to permeate through the Dual Face/Circumferential Elastomer Seal 9 material.

Figure 8B:
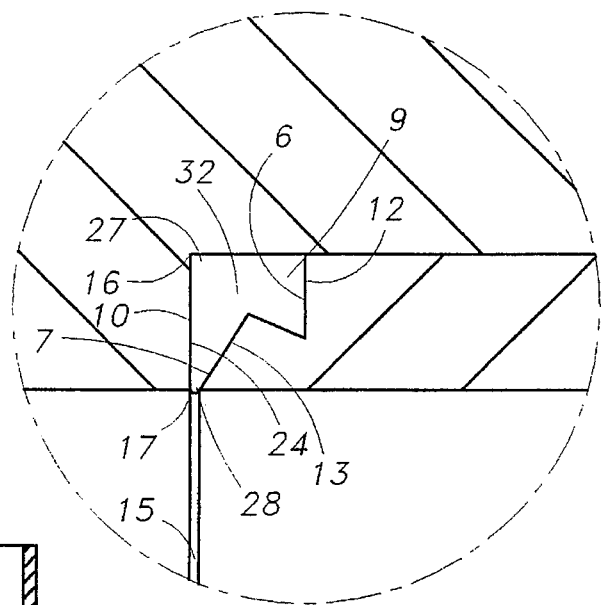
FIG. 8 is an elevation view of the Socket Fit Cross in FIG. 7, with an enlarged view of the Dual Face/Circumferential Elastomer Seal after Vacuum Seal Actuation/Compression.
Figure 8A:
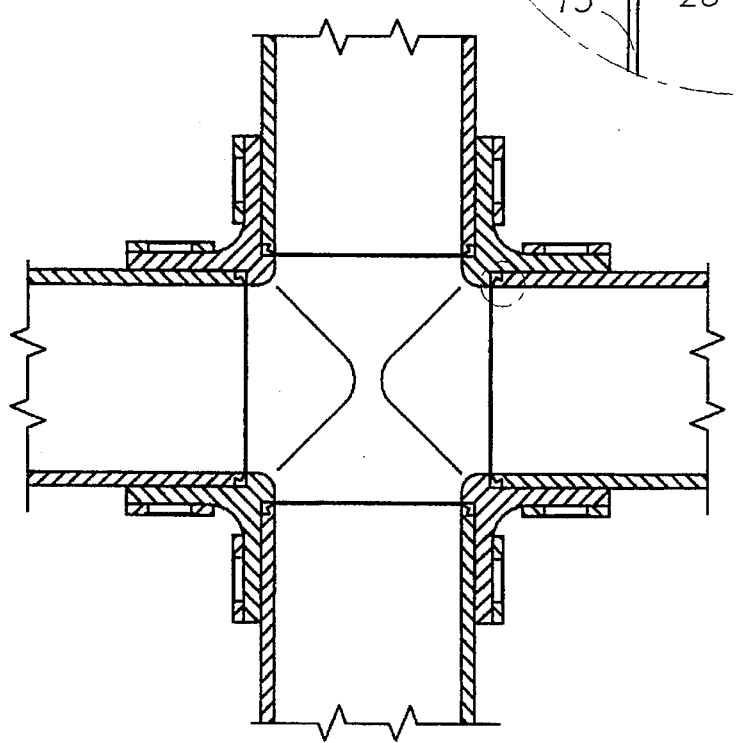

Referring to FIG. 8, the assembly in FIG. 7 is shown after the assembly has been evacuated with a vacuum pump until full Vacuum Seal Actuation/Compression 32 has been achieved. Full Vacuum Seal Actuation/Compression 32 is accomplished through the following sequence of events. When vacuum is applied to the assembly, the male component is drawn into the female socket actuating the seal in three stages. In the first stage, the Seal Groove Primary Compression Surface 6 pushes against the Seal Primary Compression Surface 12. This progressively eliminates the gap between the Seal Face Surface 10 and the Female Socket Base Surface 24 from the Seal Primary Contact Corner 16 towards the Seal Secondary Contact Corner 17. When this gap elimination is approximately half completed, the second stage Seal Groove Secondary Compression Surface 7 pushes against the Seal Secondary Compression Surface 13 which completes the elimination of the gap between the Seal Face Surface 10 and the Female Socket Base Surface 24 while directing the compression force on the Dual Face/Circumferential Elastomer Seal 9 toward the Seal Primary Compression Area 27. In the final stage of Vacuum Seal Actuation/Compression 32, the Dual Face/Circumferential Elastomer Seal 9 is extruded toward the Seal Secondary Compression Area 28 until the Vacuum Seal Actuation/Compression 32 force is equal to the force of the vacuum pressure on the male component surface area causing the Seal Process Contact Surface 15 to bulge slightly. The Seal Process Contact Surface 15 bulge indicates full Vacuum Seal Actuation/Compression 32.

Referring to FIG. 9, the assembly in FIG. 8 is shown with the addition of Heated Retaining Plugs 29 that are inserted through Retaining Plug Guide Holes 21 in the Female Socket Retaining Collars 20 until the plugs fully penetrate the Female Socket Wall 30 and partially penetrate the Male Component Wall 31 while the Dual Face/Circumferential Elastomer Seal 9 is under full Vacuum Seal Actuation/Compression 32. The number of Heated Retaining Plugs 29 that are inserted is determined by the amount of pressure the connection is required to contain and/or the amount of structural force the connection is required to withstand.

Referring to FIG. 10, there is shown a structure 60 made up of a plurality of plastic piping components, which may be made of polyvinylchloride, or other well-known plastic. The components of the structure 60 make up a booth, in the example shown in FIG. 10, which components include vertically-oriented, straight, tubular pipe-components 62 and horizontally-oriented, straight, tubular pipe-components 64, all being substantially similar to the tube 4 of FIG. 4 with associated seal 9 thereof. The structure 60 also has a plurality of cross-shaped components 66 used for interconnecting the straight pipe-components 62, 64. Each cross-shaped component is substantially similar to the cross-component 2 shown in FIGS. 5–8. In some of these cross-components 66, one of the middle openings thereof are not used, such as the corner cross-component 65. There are also provided a plurality of 90-degree, elbow-components 68 for use with the openings of the cross-components 66, each elbow-component 68 being curved to provide one opening in the horizontal plane and the other opening in the vertical plane, whereby the ends of the vertical, straight pipe-components 62 may be secured to upper and lower cross-components 66. The last type of plastic vacuum-components making up the structure 60 are tee-components 70 which are used with the corner cross-components 65 in order to couple both an end of a vertical, straight pipe-component, such as 72, and an end of a horizontal, straight pipe-component, such as 74, to one opening of a corner cross-component. In the structure 60 shown on FIG. 10, there are provided: 32 90-degree corner elbow-components 68; 18 tee-components 70; and 12 cross-components 66.

After all of the above-described components have been interconnected by using the seals 9 shown in FIGS. 2–4, with each end of each component having the seal-groove part 6,7,8 shown in FIGS. 2–4 that are used for receiving the elastomeric seals 9, the entire structure is then evacuated using a conventional roughing pump. The roughing pump is coupled to the structure via inlet 76. After the structure has been evacuated to a desired vacuum, the components are firmly affixed together by the provision of this vacuum therein. That is to say, before the vacuum is created in the tubular components of the structure 60, the structure is very flimsy. However, after the vacuum has been formed in the tubular components, the structure 60 is sturdy and capable of supporting considerable weight and of absorbing considerable forces. The process of evacuation simultaneously joins, or pulls together, all of the tubular component-connections. This arises because of the difference in pressure between the interior of the structural components and the exterior thereof. Such a pressure difference can create hundreds, and even thousands, of pounds of force holding the tubular connections together, with such force being dependent on the diameter of tubular, plastic vacuum-components. The structural binding force created is directly dependent upon the surface area of the piping components, or its diameter, as well as the amount of vacuum created, the greater the vacuum the greater the binding force.

The structure 60 may be used as a temporary structure or building, and is very light weight and inexpensive to produce. Therefore, it is especially useful in emergencies where people need temporary shelter. Other uses are, of course, possible. Owing to its lightness and ease of assembly, in any application where a portable structure or enclosure is desired, the structure 60 may be used. While only the frame of the structure 60 has been shown, it is to be understood that a roof, or top, and walls may be readily secured to the frame shown in FIG. 10 by any well-known and conventional techniques. The walls and the roof may be made of nylon, as it is now known to do, or of other material. Since the structure 60 is capable of supporting a great amount of weight, most types of material used for the walls or roof may be used. It has been found that merely creating a vacuum in the components of the structure 60 to 13.7 psi provides sufficient binding forces to the tubular joints, whereby a firm and sturdy structure is provided, which is capable of supporting walls and a roof without worry. Of course, for even greater support and binding forces for holding the structure together, vacuum pressures even below 13.7 psi are possible. A structure 60 has been built having a length of 20 feet, a width of 10 feet, and a height of 8 feet, in which a vacuum was created, and which provided a structure having superior strength, stability and integrity. The structure 60 needs no other fastening components. While it is preferred that the sealing member 9 along with the seal-groove part 6,7,8 for each component, be provided, other sealing structure may be used, such as a simple o-ring for connecting the respective, mating male and female ends of the components. It is noted that once the vacuum has been formed in the interior of the components, the vacuum-pump may be disconnected, as long as the system positively checks out that no leaks are present, which may be determined by conventional helium-leak detection systems.

While a specific embodiment of the invention has been shown and described, it is to be understood that numerous changes and modifications may be made therein without departing from the scope, spirit and intent of the invention as set forth in the appended claims.

What we claim is:

1. In a plastic vacuum-component for use in a vacuum system, said vacuum-component comprising at least one main body-portion having a first end-portion, a second end-portion, an outer surface, an inner surface, and a hollow, interior volume bounded by said inner surface, at least said first end-portion defining an opening into said hollow, interior volume, at least said first end-portion being capable of vacuum-sealed connection to a mating part of a vacuum system, the improvement comprising:

said first end-portion of said main body portion comprising groove means comprising a groove formed in, and extending about, a portion of the outer surface of said first end-portion; and elastomeric-sealing means for sealing the connection of said first end-portion with a mating part of another part of a vacuum system;

said elastomeric sealing means comprising an elastomeric ring-member at least a portion of which is received in said groove of said first end-portion;

said groove means comprising a first, interior, vertical, annular wall having an upper end and a lower end; a second, intermediate annular wall having a first end and a second end, said first end of said second wall being connected to, and forming an acute angle with, said lower end of said first wall; said groove of said groove means being located between said first and second walls; and a third, exterior, sloping, annular wall having an interior end and an exterior end, said interior end being connected to said second end of said second wall and forming an acute angle with respect to said second end of said, intermediate wall, said third wall extending in a direction from said second wall opposite to direction that said second wall extends from said first wall.

2. The plastic vacuum-component for use in a vacuum system according to claim 1, wherein said elastomeric ring-member comprises an interior-facing annular portion and an exterior-facing annular portion; said interior-facing annular portion comprising a first, interior, vertical, annular wall-surface for abutment against said first, interior, vertical annular wall of said groove means, said first, interior, vertical, annular wall-surface having an upper end and a lower end; and a second, intermediate, annular wall-surface having a first end and a second end, said first end of said second, annular wall-surface being connected to, and forming an acute angle with, said lower end of said first, annular wall-surface, said interior-facing annular portion being received in and retained by said groove means.

3. The plastic vacuum-component for use in a vacuum system according to claim 2, wherein said exterior-facing annular portion comprises a third, exterior, sloping annular wall-surface having an interior end and an exterior end, for abutment against said third, exterior, sloping annular wall of said groove means; and a fourth, exterior-facing, annular wall-surface having an upper end and a lower end, which is used for abutment against a portion of a mating part of a vacuum system; said interior end of said third wall-surface being connected to said second end of said second wall-surface.

4. The plastic vacuum-component for use in a vacuum system according to claim 3, wherein said exterior-facing annular portion of said elastomeric member comprises a fifth, annular wall-surface connecting said exterior end of said third wall-surface to said lower end of said fourth wall-surface.

5. The plastic vacuum-component for use in a vacuum system according to claim 4, wherein said fifth, annular wall-surface has an inner diameter substantially equal to the inner diameter of said main body-portion, said inner diameter of said main body-portion being the diameter of said hollow, interior volume, whereby said main body portion does not itself contact against a mating part of a vacuum system in which it is emplaced.

6. The plastic vacuum-component for use in a vacuum system according to claim 3, wherein said fourth, exterior-facing annular wall-surface of said elastomeric ring-member forms an acute angle with respect a vertical plane, so that, when the vacuum-component is emplaced in a vacuum system, said fourth annular wall-surface is drawn into a contact against a mating surface in stages in order to prevent virtual gas leaks; said fourth, annular wall-surface sloping outwardly from said first end of said main body portion, with said upper end thereof lying in a vertical plane spaced from a vertical plane in which lies said lower end thereof.

7. The plastic vacuum-component for use in a vacuum system according to claim 1, wherein said second end-portion of said main body portion comprises another groove means comprising another groove formed in, and extending about, the outer surface of said second end-portion; and another elastomeric-sealing means for sealing the connection of said second end-portion with a mating part of another part of a vacuum system;

said another elastomeric sealing means comprising an another elastomeric ring-member at least a portion of which is received in said groove of said second end-portion.

8. In a plastic vacuum-component for use in a vacuum system, said vacuum-component comprising at least one main body-portion having a first end-portion, a second end-portion, an outer surface, an inner surface, and a hollow, interior volume bounded by said inner surface, at least said first end-portion defining an opening into said hollow, interior volume, said first end-portion being capable of vacuum-sealed connection to a mating part of a vacuum system, the improvement comprising:

said first end-portion of said vacuum-component comprising groove means comprising an annular groove formed in, and extending about, a portion of the outer surface of said first end-portion in which may be received an elastomeric sealing for sealing the connection of said first end-portion with a mating part of a vacuum system;

said groove means comprising a first, interior, vertical, annular wall having an upper end and a lower end; a second, intermediate, annular wall having a first end and a second end, said first end of said second wall being connected to, and forming an acute angle with, said lower end of said first wall; said groove of said groove means being located between said first and second walls; and a third, exterior, sloping, annular wall having an interior end and an exterior, said interior end being connected to said second end of said second wall and forming an acute angle with respect to said second end of said, intermediate, wall, said third wall extending in a direction from said second wall opposite to the direction that said second wall extends from said first wall.

9. The plastic vacuum-component for use in a vacuum system according to claim 8, wherein said vacuum-component is a tubular pipe, each of said first and second end-portions being open to said hollow, interior volume.

10. The plastic vacuum-component for use in a vacuum system according to claim 8, wherein said vacuum-component is one of a cross-connector and a valve-connector; said main body-portion being a tubular element forming part of said vacuum-component.

11. An elastomeric, sealing ring for use with an end of a plastic vacuum-component for coupling the end of the plastic vacuum-component to a mating part of a vacuum system, comprising:

an interior-facing annular portion and an exterior-facing annular portion; said interior-facing annular portion comprising a first, interior, annular wall-surface having an upper end and a lower end; and a second, intermediate, annular wall-surface having a first end and a second end, said first end of said second, annular wall-surface being connected to, and forming an acute angle with, said lower end of said first, annular wall-surface;

said exterior-facing annular portion comprising a third, exterior, sloping annular wall-surface having an interior end and an exterior end; and a fourth, exterior-facing, annular wall-surface having an upper end and a lower end, which is used for abutment against a portion of a mating part of a vacuum system; said interior end of said third wall-surface being connected to said second end of said second wall surface;

said fourth, exterior-facing annular wall-surface of said elastomeric ring forming an acute angle with respect a vertical plane, so that, when the vacuum-component is emplaced in a vacuum system, said fourth annular wall-surface is drawn into a contact against a mating surface in stages in order to prevent virtual gas leaks; said upper end thereof lying in a vertical plane spaced farther away from said interior-facing annular portion of said elastomeric ring than a vertical plane in which lies said lower end thereof.

12. The plastic vacuum-component for use in a vacuum system according to claim 11, wherein said exterior-facing annular portion of said elastomeric member further comprises a fifth, annular wall-surface connecting said exterior end of said third wall-surface to said lower end of said fourth wall-surface.

\* \* \* \* \*